Patented Sept. 30, 1930

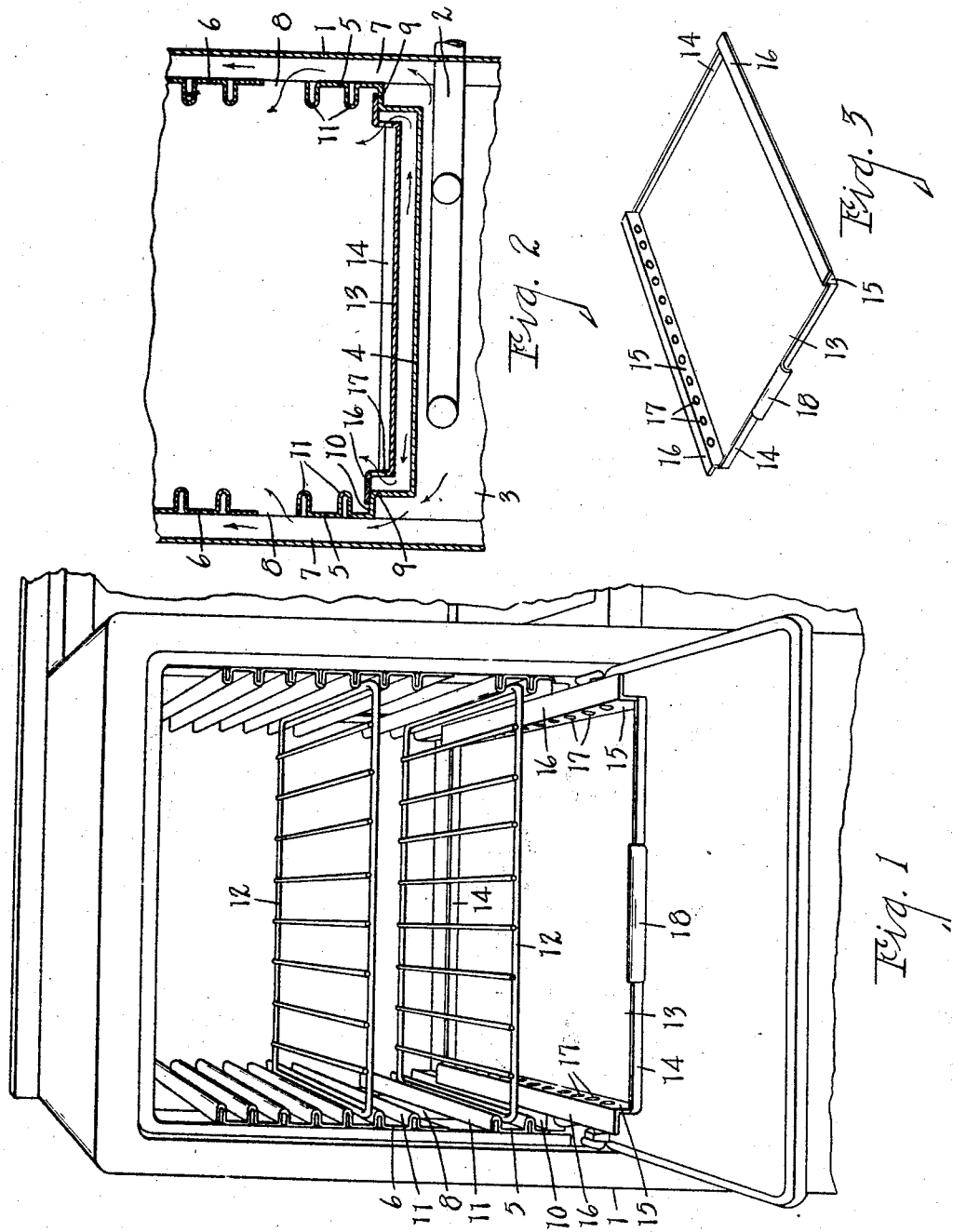

1,776,929

UNITED STATES PATENT OFFICE

ALFRED J. REEDY, OF BATTLE CREEK, MICHIGAN, ASSIGNOR TO A. B. STOVE COMPANY, OF BATTLE CREEK, MICHIGAN

OVEN

Application filed March 5, 1929. Serial No. 344,310.

The main objects of this invention are to provide an oven for cooking stoves or ranges especially those designed for domestic use which may be easily kept in a sanitary condition and one which affords an even distribution of heat, minimizing the likelihood of burning the articles cooked therein.

Objects relating to details and economies of my invention will appear from the description to follow. The invention is defined and pointed out in the claims.

A structure which is a preferred embodiment of my invention is illustrated in the accompanying drawing, in which:

Fig. 1 is a fragmentary perspective view of a cooking stove or range embodying the features of my invention.

Fig. 2 is a fragmentary vertical section through the oven.

Fig. 3 is a perspective view of the drip pan removed from the oven.

In the embodiment illustrated in the accompanying drawing, I represents the outer casing of the oven but as the structural details thereof form no part of this invention, they are not further illustrated or described herein.

The burner 2 is arranged in the lower part of this casing which constitutes a burner chamber 3. Above the burner is an imperforate bottom 4 and extending upwardly from its side edges are inner side wall members 5 and 6 coacting with the adjacent walls of the casing to provide circulating passages 7 from the burner chamber and communicating with the oven through the opening 8 by the spacing of these wall members. It will be understood that these wall members may be formed in one piece and circulating openings cut therein.

The side wall members are shouldered at 9 to provide ledges 10. The side wall members have fold-like corrugations 11 therein providing ledges for the shelves 12.

The drip pan 13 is provided with end walls 14 and side walls 15, the side walls 15 having out-turned flanges 16 adapted to rest upon the ledges 10 thereby supporting the drip pan in spaced relation to the bottom 4. The side walls 15 have circulating openings 17 therein so that heat radiating from the bottom 4 may circulate through these openings.

The drip pan is provided with a hand piece 18.

With this arrangement of parts, the drip pan is removably supported and is adapted to catch any overflow or drippings from the articles placed upon the shelves to be cooked and also serves as a baffle protecting the articles from excessive heat radiated from the bottom 4 so that the heat is more uniformly distributed throughout the oven than otherwise would be the case.

This is found to be a very great advantage as drippings can be easily removed from the drip pan which may be enameled or otherwise finished to facilitate cleaning while it would be quite impractical to enamel the bottom 4 which would be directly exposed to the intense heat of the burner.

Further, the drip pan, being removable from the oven, is more accessible for cleaning.

Having thus described my invention, what I claim as new and desire to secure by Letters Patent, is:

1. The combination in an oven provided with a burner, of an imperforate baking chamber bottom disposed above and in close proximity to said burner, baking chamber side walls extending upwardly from the side edges of the bottom in spaced relation to the side walls of the oven providing air circulating passages at the sides of the baking chamber, said side walls being provided with drip pan supporting ledges adjacent said baking chamber bottom and with a plurality of vertically spaced shelf ledges and circulating openings substantially spaced from said baking chamber bottom and located between certain of said shelf ledges, and a drip pan having side walls provided with laterally projecting flanges engaging said drip pan supporting ledges whereby said drip pan is removably supported in spaced relation to said baking chamber bottom, the drip pan side walls having circulating openings therein connecting the space between said drip pan and baking chamber bottom with the baking chamber above the drip pan.

2. The combination in an oven provided with a burner, of an imperforate baking chamber bottom disposed above and in close proximity to said burner, baking chamber side walls extending upwardly from the side edges of the bottom in spaced relation to the side walls of the oven providing air circulating passages at the sides of the baking chamber, said side walls being provided with drip pan supporting ledges adjacent said baking chamber bottom and with circulating openings substantially spaced from said baking chamber bottom, and a drip pan having side walls provided with laterally projecting flanges engaging said drip pan supporting ledges whereby said drip pan is removably supported in spaced relation to said baking chamber bottom, the drip pan side walls having circulating openings therein connecting the space between said drip pan and baking chamber bottom with the baking chamber above the drip pan.

3. The combination in an oven provided with a burner, of an imperforate baking chamber bottom disposed above and in close proximity to said burner, baking chamber side walls extending upwardly from the side edges of the bottom in spaced relation to the side walls of the oven providing air circulating passages at the sides of the baking chamber, said side walls having circulating openings therein substantially spaced from said baking chamber bottom, and a drip pan removably supported in spaced relation to said baking chamber bottom and having side walls with circulating openings therein connecting the space between the said drip pan baking chamber bottom with the baking chamber above the drip pan.

4. The combination in an oven provided with a burner, of a baking chamber bottom disposed above said burner, baking chamber side walls extending upwardly from the side edges of the bottom in spaced relation to the side walls of the oven providing air circulating passages at the sides of the baking chamber, a drip pan removably supported in spaced relation to said baking chamber bottom and having openings in one of its side walls connecting the space between the said drip pan and baking chamber bottom with the baking chamber above the drip pan.

5. The combination in an oven provided with a burner, of a baking chamber having an imperforate bottom disposed above and adjacent to the burner, said oven being provided with circulating passages open to said baking chamber at a point substantially spaced from the bottom thereof, and a drip pan removably supported in spaced relation to said baking chamber bottom and having circulating openings in a side wall thereof connecting the space between the drip pan and baking chamber bottom with the baking chamber above the drip pan.

6. The combination in an oven provided with a burner disposed at the bottom thereof, of an imperforate baking chamber bottom disposed above and in close proximity to said burner, and a drip pan removably supported in said baking chamber in spaced relation to said bottom and having circulating openings in a side wall thereof connecting the space between the drip pan and baking chamber bottom with the baking chamber above the drip pan.

7. The combination in an oven provided with a burner, of an imperforate baking chamber bottom disposed above said burner, inner side walls extending upwardly from the side edges of said bottom and provided with drip pan supporting ledges, and a drip pan having side walls with circulating openings therein and provided with laterally projecting flanges above said openings engaging said drip pan supporting ledges whereby the drip pan is removably supported in spaced relation to said bottom.

In witness whereof I have hereunto set my hand.

ALFRED J. REEDY.